United States Patent [19]
Dick

[11] 4,200,175
[45] Apr. 29, 1980

[54] CONTROL DEVICE FOR A MOTOR VEHICLE CLUTCH

[75] Inventor: Heinrich Dick, Nattheim, Fed. Rep. of Germany

[73] Assignee: Voith Getriebe KG., Fed. Rep. of Germany

[21] Appl. No.: 860,830

[22] Filed: Dec. 15, 1977

[30] Foreign Application Priority Data

Dec. 18, 1976 [DE] Fed. Rep. of Germany ....... 2657524

[51] Int. Cl.² ............................................ F16D 23/12
[52] U.S. Cl. ............................. 192/0.033; 192/0.092; 192/105 R
[58] Field of Search ............... 192/103 F, 105 F, 3.56, 192/3.58, 0.032, 0.033, 0.092, 103 R, 0.076

[56] References Cited

U.S. PATENT DOCUMENTS

| | | | |
|---|---|---|---|
| 3,628,642 | 12/1971 | Ravenel | 192/3.58 |
| 3,738,460 | 6/1973 | Noborv et al. | 192/105 F |
| 3,752,284 | 8/1973 | Brittain et al. | 192/103 F |
| 4,019,614 | 4/1977 | Prenzel | 192/103 F |

Primary Examiner—George H. Krizmanich
Attorney, Agent, or Firm—Ostrolenk, Faber, Gerb & Soffen

[57] ABSTRACT

A device for controlling a motor vehicle clutch is disclosed. A hydraulic control system coupled to the disengagement lever of a clutch selectively engages and disengages the clutch responsive to a control signal. The control signal is generated by a control circuit which receives a first signal representative of the speed of the vehicle and a second signal representative of the rotary speed of the engine. The control circuit varies the control signal during each engagement of the clutch as a function of two components: a first component which initially varies as a substantially linear function of the speed of the vehicle and thereafter varies as a positive exponential function of the speed of the vehicle; and a second component which varies as a substantially linear function of the speed of the engine. Both components vary in a direction which drives the clutch further into engagement for increasing vehicle and engine speed.

12 Claims, 4 Drawing Figures

Constant Engine Speed

Constant Vehicle Speed

CONTROL DEVICE FOR A MOTOR VEHICLE CLUTCH

BACKGROUND OF THE INVENTION

The present invention relates to a control device for a motor vehicle clutch of the type operated by a hydraulic cylinder. Control devices of this type simplify the operation of a motor vehicle by automatically engaging and disengaging the clutch during starting, gear changing, and stopping operations. It is preferable that the control device be suitable for use with all mass-produced vehicles. To this end, it is desirable that the control device be adapted for use with a standard clutch of the type operated by a clutch pedal. Preferably, the clutch pedal should also be retained, so that, if required, the clutch can be manually operated by the driver.

German Pat. No. 1,505,452 describes a control device of the general type described above. This control device operates as follows. When accelerating from a standstill, an electronic control circuit controls the engaging process of the clutch purely as a function of the rotary speed of the engine. This is achieved by controlling the magnitude of an electrical input signal applied to a pressure control valve as an inverse function of engine speed. The pressure control valve, in turn, controls the hydraulic pressure acting on the operating cylinder of the clutch. Accordingly, the magnitude of the electrical input, and therefore, the magnitude of the hydraulic pressure acting on the operating cylinder of the clutch, is progressively reduced as a function of increasing engine speed.

The manner in which the clutch is engaged during a gear changing operation is different from the foregoing process. During a gear changing operation, the electrical input signal is at its highest level. The magnitude of the control signal is reduced for a predetermined time period after completion of the gear-changing operation to a mean value, the level of which is a function of the position of the accelerator pedal. Not until the predetermined time period has elapsed is the electrical input, and therefore, the hydraulic pressure, reduced to the minimum value, thereby completing engagement of the clutch. In this prior art patent, engagement and disengagement of the clutch is controlled by a first control circuit when accelerating the vehicle from a standstill and by a second control circuit when changing gears.

Summarizing the foregoing, the prior art German patent utilizes two separate control circuits, each of which cause the clutch to be engaged in a different manner. Which of the two control elements are enabled (and therefore which of the two processes are used to operate the control device) is determined by the travel speed of the vehicle. Specifically, if the traveling speed lies below a specific value, for example, 15 km/h, the first control element is enabled. If the traveling speed lies above this value the second control element is enabled.

It is a primary object of the present invention to produce a control device for the automatic operation of a motor vehicle clutch which is constructed as simply as possible and which operates with a high degree of reliability under all operating conditions. The control device should also enable the duration of the slipping operation of the clutch, particularly when engaging the clutch, to be set very sensitively. If slipping operation continues for too long then there is a danger of severe wear on the clutch linings. If the clutch engages too quickly, an unpleasant torque impact, which under certain circumstances can induce vibrations in the vehicle drive, results.

BRIEF DESCRIPTION OF THE INVENTION

The foregoing and other objects of the present invention are obtained by providing a control device wherein the magnitude of an electrical signal controlling the operation of the clutch is dependent on both the rotary speed of the engine and on the speed of the vehicle during each engagement and disengagement of the clutch (i.e. when accelerating from a standstill, when changing gears, and when the clutch is disengaged due to the fact that the engine speed has fallen below a predetermined value).

In the preferred embodiment, the magnitude of the electrical signal controlling the operation of the clutch engagement process varies as a function of two components:

(1) a first component which initially varies as a substantially linear function of the speed of the vehicle and thereafter varies as a positive exponential function of the speed of the vehicle; and (2) a second component which varies as a substantially linear function of the speed of the engine.

Both components vary in a direction which drives the clutch further into engagement for increasing vehicle and engine speeds.

By assuring that the control signal exhibits the foregoing characteristics, a particularly distinctive direct relationship is achieved. That is, the greater the speed of the vehicle during the slipping operation of the clutch, the quicker the clutch engages. In this way, the duration of the slipping operation of the clutch becomes relatively short, and wear on the clutch linings is kept low; nevertheless, smooth engagement of the clutch is achieved. Tests have shown that by generating a control signal having the above characteristics, it is no longer necessary to take into account the instantaneous position of the accelerator as is necessary with the known control system disclosed in German Pat. No. 1,505,452. The construction of the control circuit is therefore simplified.

The direct relationship between the speed of the vehicle and the engagement time of the clutch exhibited by the present invention is also advantageous during a gear changing operation. Thus, under certain circumstances, the clutch rapidly becomes connected again purely on the basis of the vehicle speed, irrespective of the speed of the engine. This means that a high degree of travel safety is obtained during the gear-change, particularly when traversing an incline. The associated problem of changing gear when traversing an incline has been solved in a known control device, which is used to control a centrifugal clutch, by a supplementary device which ensures that at each gear-change the rotary speed of the engine cannot drop below a mean value of, for example, 1500 revolutions per minute. See German Pat. No. 1,241,280.

As noted above, the magnitude of the electrical control signal, and therefore the engagement of the clutch, initially increases as a linear rather than a progressive function of engine speed. This has the advantageous effect of permitting the vehicle to smoothly accelerate since the engine is not required to produce an unnecessarily high torque. This reduces the possibility that the engine will stall.

It is important that during the slipping phase of the clutch, the relationship between the magnitude of the control signal and the position of the clutch disengaging lever controlling the operation of the clutch be effected with the greatest possible accuracy and constancy. For this reason, it is preferable to utilize a hydraulic cylinder which is fed through an electro-hydraulic pressure control valve used to control the position of the clutch disengaging lever. The electro-hydraulic pressure control valve is preferably equipped with a magnetic force regulator which adjusts the armature attraction force of the electromagnets of the pressure control valve independently of the magnetic resistance of the magnetic system, and in particular, independently of the position of the armature within the armature stroke path. A magnetic force regulator of this kind is disclosed in U.S. Pat. No. 3,671,814. An electro-hydraulic pressure control valve equipped with this regulator constitutes a directly-operating electrically controllable pressure source. The use of this device, which operates with a high level of precision, ensures that during slipping operation the torque transmitted by the clutch corresponds particularly exactly with the "commands" of the control device.

Another feature of the present invention is that the fluid line leading to the clutch operating cylinder is also connected to a hydraulic cylinder which automatically adjusts the fuel throttle-valve in the direction of a withdrawal of fuel. Until now, such an arrangement has only been used to prevent the engine from revving excessively when the gear was changed. In the present invention, this arrangement can also be used to ensure that when accelerating from a standstill, the fuel throttle-valve cannot suddenly be fully opened, which could result in jerky loading of the vehicle drive and, under certain circumstances, spinning of the drive wheels.

BRIEF DESCRIPTION OF THE DRAWINGS

For the purpose of illustrating the invention, there is shown in the drawings several embodiments which are presently preferred; it being understood, however, that this invention is not limited to the precise arrangements and instrumentalities shown.

DETAILED DESCRIPTION OF THE PREFERRED EMBODIMENTS

Figure 1:
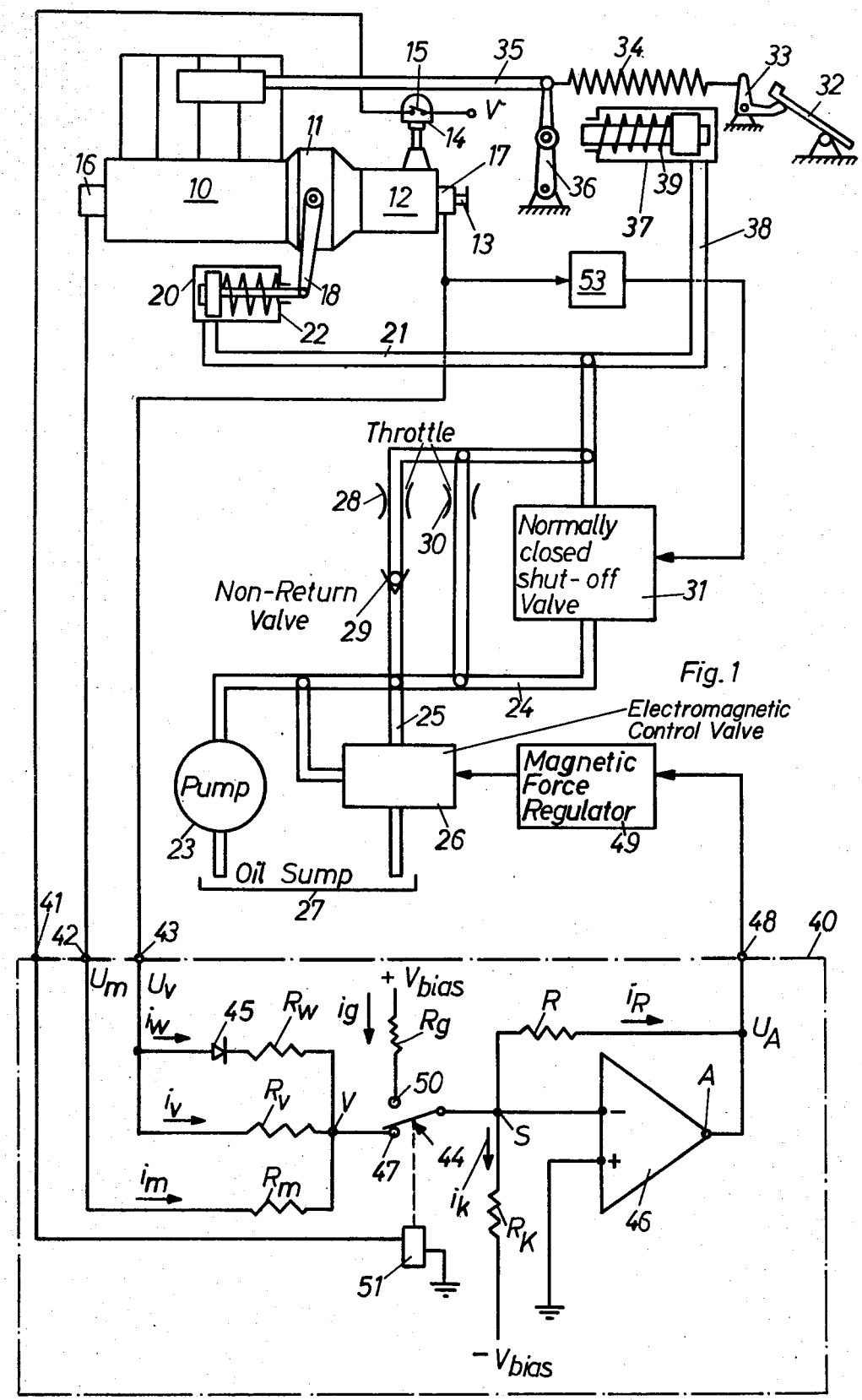
FIG. 1 shows the diagram of a control device for the automatic operation of a vehicle clutch with an electro-hydraulic pressure control valve.

Referring now to the drawings wherein like numerals indicate like elements, there is shown in FIG. 1 a vehicle drive assembly utilizing the control system of the present invention. The vehicle drive assembly comprises an internal combustion engine 10, a standard clutch 11 (which could also be operated by a standard clutch pedal), and a gear-changing mechanism 12 including a drive shaft 13 and a manual gear-change lever 14. An electrical switch 15 is built into the gear change lever 14 and is closed when the gear is being changed. A first tachometer generator 16, located at the end of engine 10, is used to measure the rotary speed of the engine (hereinafter engine speed) and thus the rotary input speed of the clutch. A second tachometer generator 17, located at the gear output, is used to measure the velocity or speed of the vehicle. The switching mechanism can also include a device for changing the gear automatically. Such a device is described in German Pat. No. 1,530,825.

Engagement and disengagement of the clutch 11 is controlled by a hydraulic cylinder 20. The piston rod of the cylinder is coupled to the disengaging lever 18 of the clutch 11 and causes the clutch to disengage whenever the cylinder is loaded with a fluid under pressure. The fluid is pumped into the cylinder via line 21 and acts against the force of a spring 22. The fluid line 24 of pump 23 is connected to a return line 25 which is connected to a pressure-free oil sump 27 via an electro-hydraulic pressure control valve 26. Three fluid lines are connected in parallel between pressure line 24 and fluid line 21. A throttle 28 and a non-return valve 29 (which shuts off the return flow) is provided in the first line; a throttle 30 is provided in the second line; and a normally closed shut-off valve 31 is provided in the third line. The combined hydraulic system operates to control the position of lever 18 (and therefore the disengagement of clutch 11) as a function of a control signal $U_A$ applied to a magnetic force regulator 49. The particular manner in which this system operates will be described below.

Figure 2:
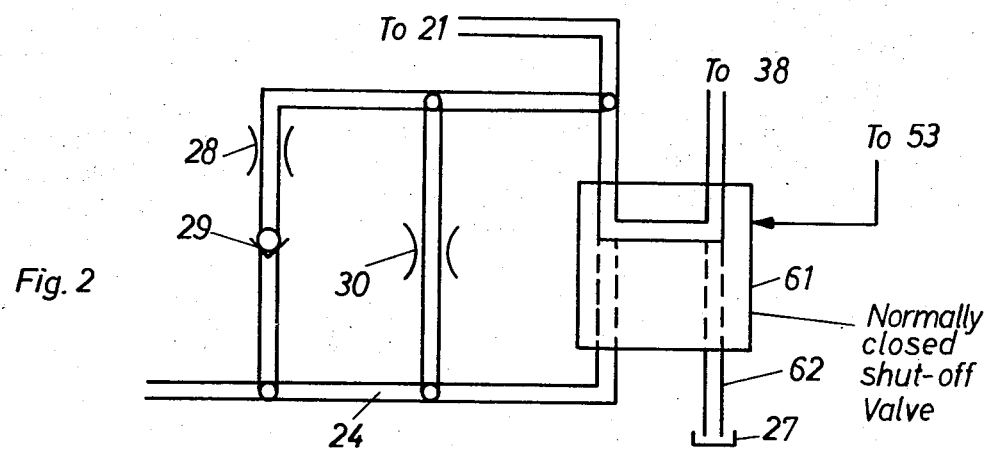
FIG. 2 is a detail from FIG. 1, showing a modified form.

The fuel throttle-valve (not shown) of the engine 10 is connected to the accelerator pedal 32 via an angled lever 33, a traction spring 34 and an adjustment rod 35. The fuel throttle-valve is opened by pressing down the accelerator 32 in the normal way. To permit the fuel throttle-valve to close automatically, the adjustment rod 35 is connected to the end of a lever 36, which is rotated in a counter clockwise direction (as viewed in FIG. 1) when a fluid under pressure is loaded into a second hydraulic cylinder 37. Particularly, when fluid under pressure is supplied (via line 38) to cylinder 37, the fluid acts against the force of spring 39 and causes the piston of cylinder 37 to extend from the cylinder and contact lever 36. In this way, cylinder 37 automatically closes (or at least partially closes) the fuel throttle-valve whenever fluid under pressure is supplied through line 38. Line 38 is directly connected to line 21 so that whenever the clutch 11 is disengaged, the fuel throttle-valve is moved in the closing direction. A modification of this arrangement is illustrated in FIG. 2 and will be described below.

As noted above, the operation of the hydraulic system controlling the position of disengagement lever 18 (and therefore the operation of clutch 11) is controlled by a control signal $U_A$. Control signal $U_A$ is generated by an electronic control circuit 40.

Electronic control circuit 40 has three inputs 41, 42 and 43. Input 41 is connected to contact 15 of gear-changing lever 14 and receives an electrical signal whenever the gear is being changed. Input 42 is connected to first tachometer generator 16 and receives an electrical signal $U_m$ whose magnitude is proportional to the speed of the engine. Input 43 is connected to second revolution counter 17 and receives an electrical signal $U_v$ whose magnitude is proportional to the speed of the vehicle.

Inputs 42 and 43 are connected to a common node V via resistors $R_m$ and $R_v$, respectively. A series connected resistor $R_w$ and diode 45 are connected in parallel with resistor $R_v$. Node V is connected via a double-throw switch 44 (which normally assumes the position shown) to a summing node S, which in turn is connected to the inverting input of operational amplifier 46. A negative biasing potential $-V_{bias}$ is applied to summing node S via resistor $R_k$. The non-inverting input of operational amplifier 46 is coupled to the system ground. The output A of operational amplifier 46 is connected to summing node S via feedback resistor R. So connected, operational amplifier 46 operates as a differential amplifier wherein the magnitude of the output signal $U_A$ generated at output A is proportional to the difference between the currents into and the currents out of nodes S. The constant of proportionality is determined by resistor R.

The output signal U is coupled to magnetic force regulator 49 via line 48. The magnetic force regulator 49 is responsive to the magnitude of the control signal $U_A$ and controls the operation of pump valve 26 (preferably an electromagnetically controlled valve). Particularly, magnetic force regulator 49 controls the relative position (relative openness) of the valve 26 as a direct function of the magnitude of signal $U_A$. By controlling the position of valve 26, regulator 49 controls the relative amount of fluid permitted to return to oil sump 27 via line 25 and therefore controls the amount of fluid pumped into the cylinder 20. Particularly, the greater the magnitude of signal $U_A$, the lesser the percentage of fluid returning to sump 27 and the greater the pressure of the fluid in line 27. In this way, the engagement of clutch 11 varies as an inverse function of the magnitude of control signal $U_A$. Of course, by properly adjusting the parameters of the system, it is possible to control the engagement of clutch 11 as a direct function of $U_A$.

The operation of control circuit 40, and the manner in which clutch 11 responds to the control signal $U_A$ will now be described. When switch 15 is closed, it generates an output signal which is applied to input 41 of control circuit 40. This input signal enables electromagnet 51 which causes the moveable arm of switch 44 to flip from contact 47 to contact 50. As a result, a positive biasing potential $+V_{bias}'$ is applied to summing node S via resistor $R_g$. The currents flowing through resistors $R_m$, $R_v$, $R_w$, $R_g$, $R_k$ and R are indicated by the arrows $i_m$, $i_v$, $i_w$, $i_g$, $i_k$ and $i_R$, respectively.

As noted above, operational amplifier 46 (hereinafter op. amp. 46) is connected to operate as a differential amplifier. As such, the currents into node S are equal to the currents out of node S. This relationship may be expressed as follows:

$$i_m + i_v + i_w = i_k + i_R \quad (1)$$

Since node S is kept at zero volts D.C. by op. amp. 46, the voltage $U_A$ is equal to $R \cdot i_R$. As such, the magnitude of control signal $U_A$ applied is determined by the following equation:

$$U_A = R(i_m + i_v + i_w - i_k) \quad (2)$$

Since regulator 49 is responsive only to the magnitude of voltage $V_A$, the following relationship is also valid:

$$U_A = R(i_k - i_m - i_v - i_w) \quad (3)$$

Since the negative biasing voltage is constant and node S is maintained at zero volts D.C., current $i_k$ is also constant. This causes the voltage $U_A$ (and therefore the pressure of the fluid in line 24) to vary inversely with currents $i_m$, $i_v$, and $i_w$. Particularly, the fluid pressure in line 24 decreases as currents $i_m$, $i_v$ and $i_w$ increase.

When the vehicle accelerates from a complete stop control circuit 40 operates as follows: Initially $i_v = 0$ and $i_w = 0$, and $i_m$ is at a value corresponding to the idling speed of engine 10. The parameters of control circuit 40 are chosen such that, during this condition, the voltage $U_A$, and with it the pressure in the line 24, is sufficiently high for the clutch 11 to be fully disengaged. The speed of the engine at which the friction areas of the clutch begin to come into contact with each other (the so-called take-up speed) is determined by adjusting the current $i_k$. This adjustment is performed by adjusting the valve of resistor $R_k$. When the driver increases the speed of the engine by depressing accelerator 32, voltage $U_m$ and current $i_m$ increase in value. In accordance with equation (3), this causes voltage $U_A$ to decrease in value and clutch 11 begins to engage to transmit power. During this period there is a linear relationship between the speed of the engine and the magnitude of voltage $U_A$. The particular linear correspondence between these two values can be varied by adjusting the resistance of resistor $R_m$.

When the vehicle starts to move, the voltage $U_v$ and the current $i_v$ increase. An increase in the magnitude of current $i_w$ is temporarily delayed by the blocking effect of diode 45. The increase in the magnitude of current $i_v$ results in a reduction in the magnitude of control signal $U_A$. During the period that the current $i_w$ is suppressed by diode 45, there is a linear relation between the speed of the vehicle and the magnitude of voltage $U_A$ (assuming that the speed of the engine remains constant). See equation (3). When the speed of the vehicle exceeds a predetermined value and the magnitude of the signal $U_v$ becomes greater than the threshold voltage of the diode 45, the diode becomes conducting. At this point, the current $i_w$ will increase with the result that the speed of the vehicle has an even stronger effect on the magnitude of $U_A$. In other words, the voltage $U_A$ decreases progressively (exponentially) with increasing travel speed, so that the clutch 11 finally becomes fully engaged very rapidly and now operates without slipping. At the same time, the piston of the hydraulic cylinder 37 is withdrawn and a full throttle can be applied.

The unloading of the two operating cylinders 20 and 37, i.e. the return flow of the operative fluid, is initially carried out through the throttle 30 alone with the result that the engaging movement of the clutch 11 is dampened. However, this dampening effect is immediately reduced by opening the valve 31. This is effected by a signal generator 53 which excites the electro-magnets of the valve 31 when the vehicle exceeds a predetermined speed, for example, 5 km/h.

As soon as the driver touches the gear lever 14 to carry out a gear-change, the contact 15 closes and magnetic relay 51 is enabled. The moveable arm of switch 44 disengages contact 47 and engages contact 50. Since node S is no longer coupled to node V, the relatively strong currents $i_m$, $i_v$ and $i_w$ are no longer applied to the summing junction (node S) of op. amp. 46. Instead, a relatively weak current $i_g$ is applied thereto. This sudden drop in current into node S results in a sudden increase in the magnitude of voltage $U_A$, and with it an increase in the pressure in the line 24. The increase in pressure in line 24 causes the clutch 11 to immediately disengage. At the same time the fuel throttle-valve is moved in the closing direction. When the gear-change has been completed, switch 14 closes, switch 44 returns to the position shown and the magnitude voltage $U_A$ again depends on both the rotary speed of the engine and the speed of the vehicle. If the driver has not accelerated (so the current $i_m$ corresponds to the idling speed of the engine 10) then, as a general rule, the speed of the vehicle (and, therefore, the magnitude of current $i_v$) will still be sufficient to reduce the voltage $U_A$ to a value which will permit the clutch 11 to reengage.

FIG. 2 illustrates one possible variation in the system of FIG. 1. Specifically, FIG. 2 illustrates a two-way valve 61 which may replace the shut off valve 31 of FIG. 1. In the position shown, the two fluid lines 21 and 38 which lead to the hydraulic cylinders 20 and 37, respectively, are connected to each other, as is the case in the embodiment of FIG. 1, when valve 31 is closed. In the other position of the valve 61, also enabled by signal generator 53 at a predetermined travel speed, a separate return inlet 62 is opened in the sump 27 for the fuel withdrawal operating cylinder 37. This enables the driver to make a flying start.

Figure 3:
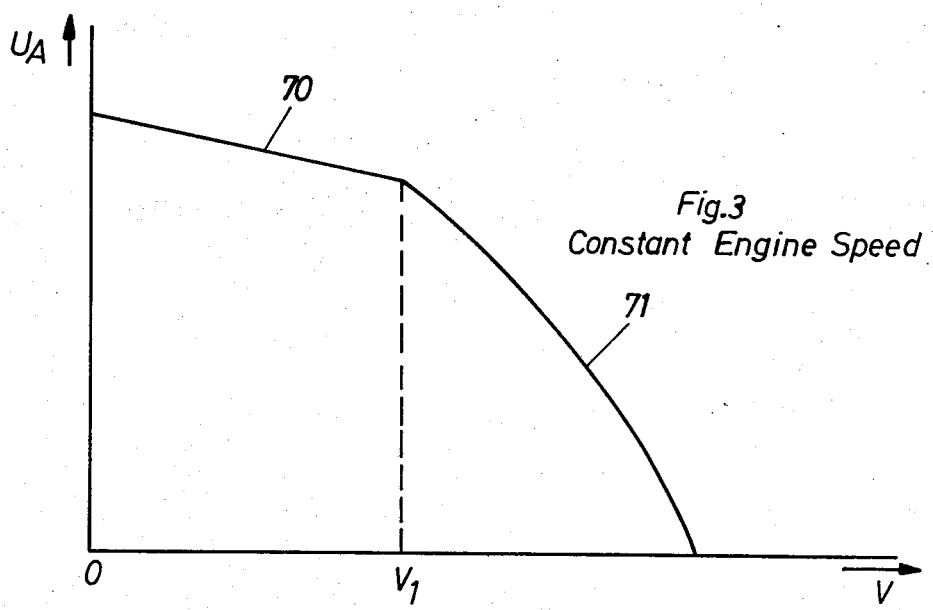
FIGS. 3 and 4 are diagrams which show the dependence of the amount of electrical input to be supplied to the pressure control valve, on the speed of the vehicle and on the rotary speed of the engine, respectively.

FIG. 3 is a graph illustrating the relationship between the magnitude of the control signal $U_A$ and the speed of the vehicle, assuming a constant engine speed. It can be seen that the magnitude of the control $U_A$ is at its greatest level when the vehicle is stationary, i.e. when $v=0$. If the vehicle is accelerated, $U_A$ decreases in a substantially linear manner (along the straight line 70). However, as explained above, when the travel speed exceeds a predetermined value $v_1$, (determined by the threshold voltage of the standard diode 45) the voltage decreases exponentially and therefore more sharply than before (along the line 71).

Figure 4:
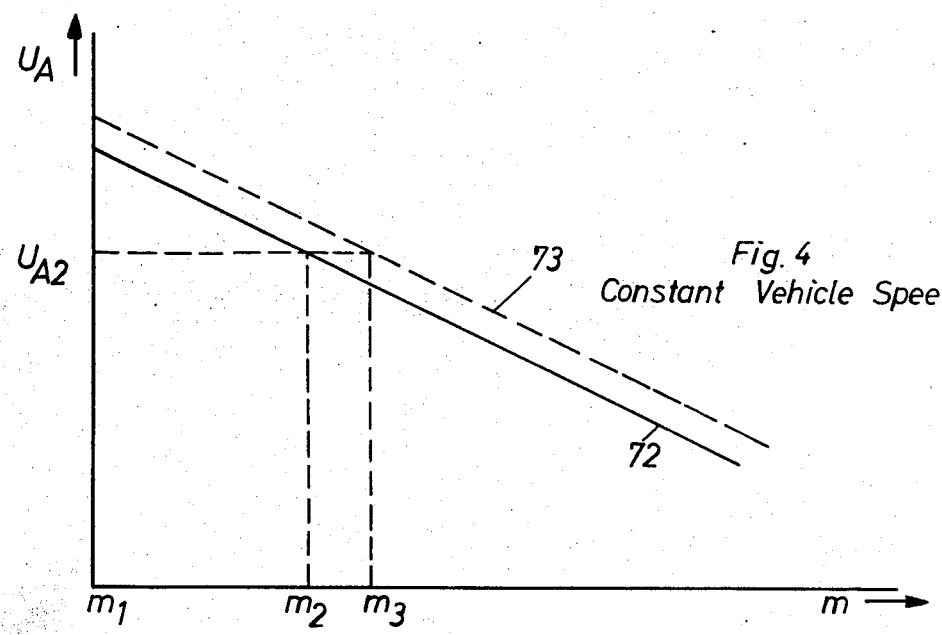

FIG. 4 is a graph illustrating the relationship between the magnitude of the control signal $U_A$ and the speed of the engine, assuming a constant vehicle speed. It can be seen that the magnitude of the control voltage $U_A$ is at its maximum value when the engine is rotating at its idling speed $m_1$. If the speed of the engine is accelerated, $U_A$ decreases as a substantially linear function of engine speed. The take-up speed is designated $m_2$. At this point the voltage $U_A = U_{A2}$ and the clutch is already beginning to transmit torque. By altering the resistance $R_k$ (FIG. 1) the line 72 can be shifted, for example, to the line 73 shown in dashes. Then the take-up speed is higher, namely $m_3$.

The path of the dependence of the voltage $U_A$ on the travel speed $v$, i.e. the slope of the curves 70, 71 in FIG. 3, can be altered primarily by adjusting the resistance $R_v$ in the control circuit 40 (FIG. 1). In the progressive range, when the travel speed is higher than $v_1$, the path of the voltage $U_A$ can also be additionally altered by adjusting the resistance $R_w$. In a corresponding manner, as already mentioned above, in FIG. 4 the slope of the line 72 can be changed by adjustment of the resistance $R_m$. The behavior of the clutch can be adapted by all these measures to the requirements imposed by the vehicle involved (e.g. size of the vehicle, torque characteristics of the engine).

The present invention may be embodied in other specific forms without departing from the spirit or essential attributes thereof and, accordingly, reference should be made to the appended claims, rather than to the foregoing specification as indicated in the scope of the invention.

What is claimed is:

1. Apparatus for controlling the operation of a clutch of the type which selectively couples a vehicle engine to a gear changing mechanism, said apparatus comprising:
   (A) clutch control means for moving said clutch between an engaging and disengaging position as a function of a control signal applied thereto;
   (B) control circuit means for generating said control signal as a function of the rotary speed of said engine and the speed of said vehicle, said control circuit to vary said control signal during each engagement of said cluth as a function of two components:
      (1) a first component which initially varies as a substantially linear function of the speed of the vehicle and thereafter varies as a positive exponential function of the speed of the vehicle; and
      (2) a second component which varies as a substantially linear function of the speed of said engine, said first and second components varying in a direction which drives the clutch further into engagement for increasing vehicle and engine speeds, respectively.

2. The apparatus of claim 1 wherein said clutch control means comprises:
   a hydraulic cylinder coupled to a disengaging lever of said clutch, said cylinder adapted to move said lever between an engaging and disengaging position as a function of the pressure of a fluid applied to said cylinder;
   a pump for pumping fluid under pressure into said cylinder;
   fluid control means including an electro-hydraulic pressure control valve for controlling the pressure of the fluid applied to said cylinder as a function of the relative position of said control valve.

3. The apparatus of claim 2 wherein said electro-hydraulic pressure controls valve includes a magnet which control the relative position of said control valve and wherein said fluid control means further includes a magnetic force regulator which adjusts the armature attracting force of said electro-magnets, irrespective of the magnetic resistance of the magnetic system, to a value which is determined by said control signal.

4. The apparatus of claim 1 wherein said control circuit means comprises:
   means for generating a first current signal proportional to the speed of said engine;
   means for generating a second current signal proportional to the speed of said vehicle;
   means for generating a third current signal when the speed of said vehicle is greater than a predetermined value, said third current signal increasing with the speed of said vehicle; and
   summing means for generating said control signal as a function of the sum of said first, second and third current signals.

5. The apparatus of claim 4 wherein said summing means is an operational amplifier connected to operate as a differential amplifier.

6. The apparatus of claim 5 wherein said means for generating a third current signal includes a series connected diode and resistor which are connected between a voltage whose magnitude is proportional to the speed of said vehicle and said operational amplifier.

7. The apparatus of claim 1 further including:
   means for generating a first voltage whose magnitude is proportional to the speed of said engine; and
   means for generating a second voltage whose magnitude is proportional to the speed of said vehicle.

8. The apparatus of claim 7 wherein said control circuit comprises:
- means for generating a first current signal proportional to the speed of said engine;
- means for generating a second current signal proportional to the speed of said vehicle;
- means for generating a third current signal when the speed of said vehicle is greater than a predetermined value, said third current signal increasing with the speed of said vehicle;
- summing means for generating said control signal as a function of the sum of said first, second and third current signals.

9. The apparatus of claim 8 wherein said means for generating a first current signal comprises a resistive element connected between said voltage which is proportional to the speed of said engine and ground said means for generating said second current signal comprises a resistor connected between said voltage whose magnitude is proportional to the speed of said vehicle and ground and said means for generating said third current signal comprises a series connected diode and resistor which are connected between said voltage whose magnitude is proportional to the speed of said vehicle and ground.

10. The apparatus of claim 9 wherein said means for generating said control signal is an operational amplifier connected to operate as a differential amplifier.

11. The apparatus of claim 8 wherein said control circuit means further includes means for generating a biasing voltage which may be adjusted to determine the speed of the engine at which the clutch begins to engage and wherein said summing means generates said control signal as a function of said biasing signal as well as the function of said first, second and third current signals.

12. The apparatus of claim 1 wherein said vehicle engine is the type which is controlled by a fuel throttle valve and wherein said apparatus further includes means for automatically reducing the opening of said fuel throttle valve whenever the speed of the vehicle is below a predetermined value.

* * * * *